US005180913A

United States Patent [19]

Laue

[11] Patent Number: 5,180,913

[45] Date of Patent: Jan. 19, 1993

[54] METHOD AND MASS SPECTROMETER FOR MASS SPECTROSCOPIC OR MASS SPECTROMETRIC INVESTIGATION OF PARTICLES

[75] Inventor: Hans-Jörg Laue, Bremen, Fed. Rep. of Germany

[73] Assignee: Finnigan Mat GmbH, Bremen, Fed. Rep. of Germany

[21] Appl. No.: 645,621

[22] Filed: Jan. 25, 1991

[30] Foreign Application Priority Data

Feb. 1, 1990 [DE] Fed. Rep. of Germany ....... 4002849

[51] Int. Cl.[5] ........................ A01J 49/00; B01D 59/44

[52] U.S. Cl. .................................... 250/281; 250/283; 250/305

[58] Field of Search ........... 250/309, 283, 281, 396 R, 250/305; 313/360.1, 361.1, 363.1

[56] References Cited

U.S. PATENT DOCUMENTS 3,805,068 4/1974 Lee .................................... 250/305
4,670,651 6/1987 Meier ................................ 250/309
4,766,314 8/1988 Jung ................................ 250/396 R
4,789,780 12/1988 Le Poole et al. .................. 250/305
4,800,273 1/1989 Phillips .............................. 250/309
4,823,013 4/1989 Van der Mast ................. 250/396 R
5,043,575 8/1991 Habfast et al. ...................... 250/283

OTHER PUBLICATIONS

"Retarding-Field Differential-Output Energy Prefilter for High-Performance Secondary Ion Mass Spectrometry", Thompson et al., *Rev. Sci. Inst.*, vol. 56, No. 8, Aug. 1985, pp. 1557-1563.

*Primary Examiner*—Bruce C. Anderson
*Attorney, Agent, or Firm*—Flehr, Hobach, Test, Albritton & Herbert

[57] ABSTRACT

The invention relates to a method and a mass spectrometer for mass spectroscopic or mass spectrometric investigation of particles. The particles are separated in a separating system in accordance with their different masses. In order to reduce detection errors due to scattered particles, there is arranged upstream of a detecting device a correction device which builds up a braking potential in order to suppress particles having an energy loss due to scattering. The invention provides a further, preferably combined correction, by means of which the particles are selected as a function of their direction of motion. For this purpose, the mass spectrometer according to the invention preferably has at least one braking electrode and one quadrupole lens.

2 Claims, 1 Drawing Sheet

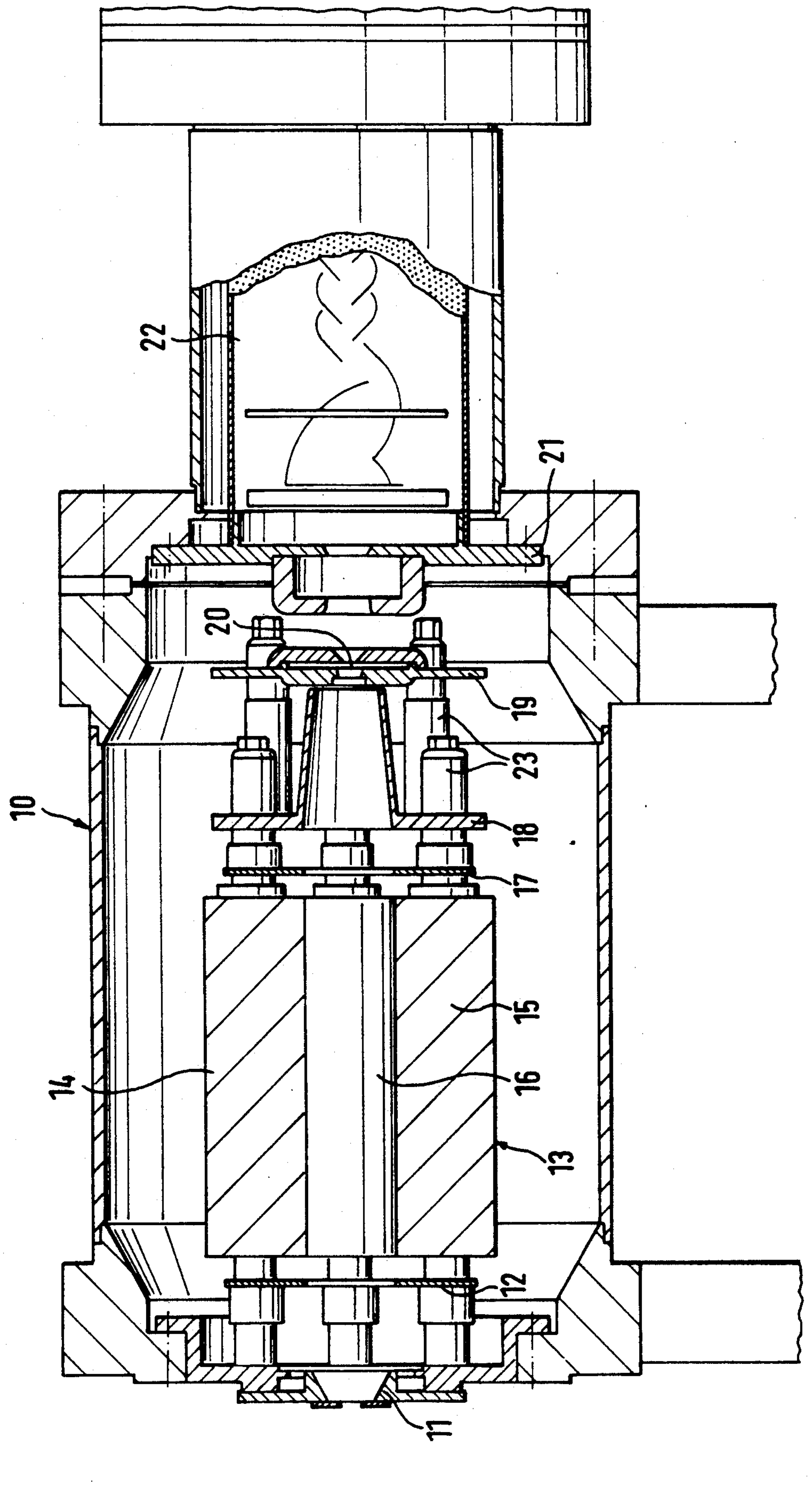
22
21
20
19
23
10
18
17
15
14
16
13
12
11

METHOD AND MASS SPECTROMETER FOR MASS SPECTROSCOPIC OR MASS SPECTROMETRIC INVESTIGATION OF PARTICLES

BACKGROUND OF THE INVENTION

The invention relates to a method for mass spectroscopic or mass spectrometric investigation of particles, preferably of isotopes or molecule ions, in which a particle beam is separated in a separating system in accordance with the different particle masses and the particles are detected in a detecting device, and in which in order to reduce detection errors caused by particles which possess a particle mass, especially adjacent mass, that deviates from the particle mass of interest during the (instantaneous) particle detection (abundance sensitivity), a correction takes place by using a braking potential to keep from the detecting device or to suppress (energy selection) particles having a (kinetic) energy that is smaller than that to be expected for the particles of correct mass to be detected, or particles having an energy loss of a predetermined value.

Moreover, the invention relates to a mass spectrometer, preferably for carrying out said method.

A mass spectrometer has a separating system by means of which a particle beam is separated in accordance with the different particle masses. In this process, the particle beam is normally fanned out into a plurality of discrete component beams. A sector magnet is normally a component of the separating system.

The relative mass distribution of particle masses inside the original particle beam can be determined by means of the mass spectrometer by detecting the particles of the component beams simultaneously or sequentially over a certain time interval. A detector element of the detecting device is tuned for this purpose to the particle beam to be recorded. Such a detector element can comprise, for example, an electron multiplier or also a Faraday cage.

The detection of particles of the component beams results in a mass spectrum having mass spectral lines. The possibility of distinguishing or separating individual spectral lines from one another during the analysis depends essentially upon the resolving power of the mass spectrometer.

Detection errors which are reflected in a correspondingly distorting fashion in the mass spectrum can result, inter alia, from scattering processes of the particles before entry into the detecting device. Due to such a scattering process, a particle can enter the detecting device at a location that does not correspond to the position of the component beam corresponding to the particle mass of the particle. This means that the detected particle is regarded as a particle of a mass that it does not really have at all. This erroneous detection thus leads to an enlargement of the area of a spectral line in the mass spectrum which does not correspond to the actual detected particle. In particular, due to such erroneous detections the spectral lines acquire so-called "tails" in their foot region. The spectral lines are thus widened in the foot region. In "tails" of strong spectral lines, in particular, weaker, adjacent spectral lines can vanish and thus remain unrecognised.

Since during scattering processes of the particles there is always a more or less large energy loss of the particles, the abovementioned "tails" are located essentially on the low-mass side of the spectral lines. However, "tails" can also arise on the high-mass side of the spectral lines if the energy loss of the scattered particles is relatively low.

For example, scattering processes can take place on residual gas molecules or also on surfaces. In this connection, the scattering processes on surfaces can lead to a relatively large scattering angle in conjunction with a relatively low energy loss of the particles, that is to say in particular to the "tails" on the high-mass side.

In a mass spectrometer or in a mass spectrometric method it is desirable, after all, to reduce erroneous detections of particles, and in this way to suppress the "tails" or spurs of the spectral lines.

Since the particles lose more or less energy during scattering processes, it is possible to sort scattered particles at least partially by means of an energy filter, that is to say to prevent them from entering the detecting device (energy selection). This can be done with the aid of a braking electrode upstream of the detecting device, by means of which a braking potential is built up against which all particles must run in order to reach the detecting device. In this process, the potential barrier of the braking potential can be tuned such that only unscattered particles can surmount said barrier, whereas scattered particles that no longer possess sufficient energy fail at the potential barrier and do not reach the detecting device. It is possible by means of said procedure at least to diminish the spurs of the mass spectral lines on the low-mass side.

As an example, all non-scattered particles could have an energy of approximately 10 keV. In this regard, there is a certain energy distribution of particles which depends upon the initial conditions in the particle source. In proportion to the mean energy of the particles, the width of the energy distribution or the "energy smear", amounts in this regard to $5\times10^{-5}$, for example. In the example chosen, surge-induced energy losses are generally greater than 2 eV, so that it is possible to utilise an energy filter which can be tuned to filter out or retain all particles having an energy loss of between 50 eV and 1 eV. 1 eV is in the proportion of $1\times10^{-4}$ to the chosen mean energy of 10 keV, so that even though it relatively reliably retains scattered particles a filter which filters out at this order of magnitude does not yet reach into the range of width of energy distribution of $5\times10^{-5}$.

Although braking the particles to be detected can act to improve reduction of the low-mass spurs of the spectral lines, it has no such effect on the spurs on the high-mass side of the spectral lines. Scattered particles having only a slight energy loss pass through the filter.

Moreover, due to the energy filter all particles, that is to say also the unscattered particles, are braked at least, as a result of which the mass spectral lineshape is worsened over all, since the spectral line is widened hereby. This finally detracts from the resolving power of the mass spectrometer.

OBJECT AND SUMMARY OF INVENTION

It is therefore the object of the invention with regard to the abovementioned problems to improve the detection correction in the case of a method according to the preamble.

This object is achieved according to the invention when a correction is (additionally) carried out in which the particles moving onto the detecting device are selected as a function of their direction of motion (as a function of their angle of incidence).

Said supplementary correction or said modification of the total correction also enables a reduction in the spurs of the spectral line on the high-mass side. To be precise, it is also possible by means of selecting the direction of motion to filter out those particles which, although having been scattered, thus changing their direction of motion, have lost only a little energy thereby.

On the other hand, the unscattered particles, which have retained their direction of motion, can be favourably influenced by the selection of the direction of motion, so that in particular the effects of the braking potential directed towards widening the particle beam and thus worsening the spectral lines can be compensated with advantage.

A combined selection of the energy and direction of motion of the particles is preferably carried out in such a way that particles having incorrect energy are defocused. Conversely, it is possible hereby for particles having the correct energy to be expected to be focused. Scattered particles are thereby directed past the detecting device, whereas the correct component beam is focused, in order to prevent or cancel beam widening due to the braking potential.

For the purpose of achieving the object set, a mass spectrometer according to the invention is characterised according to the invention in that the correction device comprises a particle optical system for selecting the particle moving onto the detecting device as a function of the direction of motion (as a function of the angle of incidence). Said particle optical system is preferably constructed with multiple lenses. In a preferred exemplary embodiment, the particle optical system comprises a quadrupole lens.

Thus, as a whole the correction device of the mass spectrometer according to the invention advantageously represents a system, which is optimised with respect to particle optics and achieves advantageous ion optical properties combined with a braking potential or in conjunction with simultaneous formation of a braking potential.

Further advantageous embodiments of the method according to the invention, or embodiments of the mass spectrometer according to the invention follow from the respective subclaims.

BRIEF DESCRIPTION OF THE DRAWING

An exemplary embodiment of a correction device of a mass spectrometer, from which further inventive features follow, is represented in the drawing by a cross sectional view.

DESCRIPTION OF PREFERRED EMBODIMENT

The drawing shows an exemplary embodiment of a correction device for a mass spectrometer according to the invention. The separating system of the mass spectrometer, which is arranged upstream of the correction device 10, is not represented. Coming from the separating system, the particle beam enters, or the particle beams enter (from the left in the representation of the drawing), the correction device 10 through a horizontal entry slit 11. The entry slit 11 extends in the plane of the drawing in the particle beam plane. This latter function by itself is described in an article entitled "A New Filter Supplement for Isotope Ratio Measurements" by H. J. Laue and H. Wollnick (International Journal of Mass Spectrometry and Ion Processes, 84 (1988) 231-241)

Arranged following the entry slit 11 in the particle beam direction is a first particle lens or a pre-lens 12. Following the pre-lens 12 is a quadrupole lens 13 having a first electrode pair, formed as an upper electrode 14 and a lower electrode 15, and having a second electrode pair formed from a right hand and a left hand electrode 16.

A screening aperture or a screening lens 17 is connected to the quadrupole lens 13 in the beam direction. Following said screening lens 17 is a funnel-shaped lens 18. Said funnel-shaped lens 18 tapers conically in the beam direction from a relatively large cross-section to a relatively small cross-section.

Immediately following the funnel-shaped lens 18 is a braking lens 19. Said braking lens 19 has a through channel 20, which tapers stepwise in its cross-section in the beam direction on the side of the particle entry, and once again widens conically to a larger cross-section on the side of particle exit.

Following the braking lens 19 is a focusing lens 21. Arranged downstream of said focusing lens 21 is a detector element of a detecting device. In the present case an electron multiplier tube 22.

The lens system according to the invention of the correction device 10, consisting of the pre-lens 12, the quadrupole lens 13, the screening lens 17, the funnel-shaped lens 18, the braking lens 19 and the focusing lens 21, serves to form a braking potential for braking the incident particles, especially for filtering out scattered particles having energy losses, and also serving at the same time as a particle optical system for filtering out scattered particles as a function of their direction of motion or as a function of their angle, and for focusing the particle beam of unscattered particles. Both functions are achieved in an optimum fashion by the total combination of the lenses. In this arrangement, however, the braking lens 19 can essentially be ascribed the braking function, and the quadrupole lens 13 the focusing function or defocusing function.

The lenses are fastened to isolators 23 or connected to one another. The lenses are connected to different electrical potentials. In this arrangement, it is also possible for the electrical potentials of the first and of the second electrode pairs of the quadrupole lens 13 to be different.

For example, in order to detect ions which are accelerated by an ionising potential of 10 kV and have an energy of 10 keV, the following potential combinations can be selected:

| | |
|---|---|
| Entry slit 11: | 0 V, |
| Pre-lens 12: | 7816 V, |
| First electrode pair 14, 15: | 7936 V, |
| Second electrode pair 16: | 7696 V, |
| Screening lens 17: | 7816 V, |
| Funnel-shaped lens 18: | 9894 V, |
| Braking lens 19: | 9995 V, |
| Focusing lens 21: | 0 V. |

The energy distribution of the ions depends upon the initial conditions in the ion source (not represented). The following two factors are essential: potential distribution at the ionising site and thermal energy of the ions. Taken together, said factors yield a width of energy distribution or an energy smear of $5\times10^{-5}$ (energy width to mean energy).

The surge-induced energy losses of the particles are generally larger than 2 eV. The correction device 10 is thus tuned such that all ions having an energy loss between 50 eV and 1 eV are retained, that is they do not reach the detecting device 22.

In this process, the scattered particles are not only filtered out by energy, but the ions having the correct energy are focused, whereas the ions having the wrong energy are defocused.

The particle optical system or its elements are not necessarily constructed to be axially symmetric with respect to the particle beam axis, even if individual terms such as tubular or funnel-shaped seem to point to this. Rather, the elements of the particle optical system can, for example, also be constructed with a relatively large extent transverse to the beam direction in the beam plane.

I claim:

1. A mass spectrometer including a separating system for separating a particle beam in accordance with different particle masses comprising:

a detecting device for detecting said particles when arriving at said detecting device;

a correction device comprising first correction means for keeping away particles having an energy being smaller than an expected energy to be detected away from said detecting device and second correction means for keeping away particles moving in a direction differing from an expected direction from said detecting device;

said first correcting means comprising at least one braking electrode to which a braking potential is applied and said second correcting means comprising a particle optical system;

an entry slit arranged upstream of said particle optical system;

said entry slit being held at a reference potential, successively arranged lenses being held at successively increasing potentials, said braking electrode having a maximum potential, and a focusing lens being arranged downstream of said braking electrode being held at said reference potential.

2. Mass spectrometer according to claim 1 in which said particle optical system comprises a pre-lens being held at a potential of approximately 7816 volts and, downstream thereof, a quadrupole lens, an electrode pair thereof being held at a potential of approximately 7936 volts to 7696 volts, a screening aperture being provided upstream of said braking electrode and being held at a potential of approximately 7816 volts, a tubular lens being provided upstream of said braking electrode and being held at a potential of approximately 9894 volts and said braking electrode being held at a potential of approximately 9995 volts.

* * * * *